United States Patent [19]

McInerney

[11] 4,251,050

[45] Feb. 17, 1981

[54] TURBOCHARGER CONTROL ACTUATOR

[75] Inventor: Charles E. McInerney, Rolling Hills Estates, Calif.

[73] Assignee: The Garrett Corp., Los Angeles, Calif.

[21] Appl. No.: 843,392

[22] Filed: Oct. 18, 1977

[51] Int. Cl.³ .............................. F16K 31/145
[52] U.S. Cl. ...................... 251/61; 92/94; 92/98 D; 92/167; 92/168
[58] Field of Search ............... 92/100, 167, 168, 94, 92/98 R, 98 D, 99, 165 R; 277/212 FB, 165, 30; 74/18.2; 60/602; 251/61, 61.4

[56] References Cited

U.S. PATENT DOCUMENTS

| 1,029,143 | 6/1912 | Rich | 92/167 |
|---|---|---|---|
| 2,142,190 | 1/1939 | Hewitt | 92/168 |
| 2,202,351 | 5/1940 | Loweke | 74/18.2 |
| 2,515,865 | 7/1950 | Fisher | 92/100 |
| 2,799,248 | 7/1957 | Scheel | 92/168 |
| 3,257,796 | 6/1966 | Updike | 60/602 |
| 3,303,751 | 2/1967 | Bratten | 92/168 |
| 3,410,179 | 11/1968 | Kytta | 92/167 |
| 3,626,770 | 12/1971 | Lindberg | 74/18.2 |
| 3,695,149 | 10/1972 | Eberhart | 92/168 |
| 3,847,063 | 11/1974 | Cooksey | 92/100 |
| 3,887,196 | 6/1975 | Renfron | 277/30 |
| 4,116,115 | 9/1978 | Gross | 92/168 |
| 4,122,759 | 10/1978 | Runkel | 92/168 |

FOREIGN PATENT DOCUMENTS 1353294  5/1974  United Kingdom .

Primary Examiner—Abraham Hershkovitz
Attorney, Agent, or Firm—Albert J. Miller; Joel D. Talcott; Stuart O. Lowry

[57] ABSTRACT

A control actuator for a turbocharger comprises a diaphragm-displaced actuator rod projecting outwardly from an actuator housing through a seal permitting axial and angular rod movement for variably positioning a turbocharger wastegate valve.

12 Claims, 5 Drawing Figures

TURBOCHARGER CONTROL ACTUATOR

BACKGROUND OF THE INVENTION

This invention relates to turbochargers and control devices therefor. More specifically, this invention relates to an improved pressure-responsive actuator for controlling the operation of a turbocharger.

Turbochargers are well known in the prior art, and typically comprise a trubine for driving a compressor to supply relatively high pressure charge air to a combustion engine. The turbine is rotatably driven by exhaust gases from the engine, and in turn rotatably drives a compressor for compressing intake air supplied to the engine. One major design problem with turbochargers, however, is that the rotational speed of the turbine and the compressor increases as the speed and/or load of the engine increases. At relatively high operating speeds or loads, it is possible for the turbine and compressor to be driven at speeds above critical design limits, or for the compressor to supply charge air to the engine at boost pressures higher than the engine can withstand.

A wide variety of control devices for turbochargers has been developed to limit the rotational speed of the turbocharger compressor, and thereby control the level of boost supplied by the compressor. Such devices may be blow-off or pop-off valves, turbine wastegate valves, compressor inlet control valves, and the like. These valve devices are generally similar to each other in principle in that each comprises a valve responsive to a predetermined pressure level or pressure differential to restrict the availability of gases for driving the turbine, or for compression by the compressor. For example, a turbine wastegate valve operates within a passage by-passing the turbine, and when opened by a pressure responsive valve actuator, allows a portion of the engine exhaust gases to bypass the turbine to atmosphere. In this manner, the turbine is rotatably driven by a relatively reduced mass flow of exhaust gases to limit the rotational speed of the turbine, and thereby also limit the rotational speed and resultant boost pressure of the compressor.

Pressure responsive valve actuators typically comprise an actuator housing including a diaphragm dividing the housing into a pair of separated chambers. Inlet ports are provided for coupling the two chambers to a different sources of pressure to subject the diaphragm to a predetermined pressure differential. Changes in the pressure differential, such as may occur during increase or decrease in engine speed of load, cause displacement of the diaphragm which in turn displaces an actuator rod connected to the diaphragm. The rod projects out of the housing, and is connected to an appropriate valve structure on the compressor or turbine for positioning the valve to control turbocharger operation.

In practice, one major consideration in the design of pressure responsive valve actuators is to provide an adequate seal allowing passage of the actuator rod housing without significant gas leakage. This is particularly important wherein the pressure sources coupled to the actuator housing comprise gaseous air-fuel mixtures, and wherein the actuator housing is mounted close to hot engine components or the turbine of the turbocharger. In this regard, prior art seals which satisfactorily prevent gas leakage have restricted movement of the actuator rod to axial movement only. This type of seal finds its primary application wherein the actuator rod comprises a valve stem connected directly to or formed integrally with a valve head, and wherein axial rod movement is sufficient to properly position the valve head. See, for example, U.S. Pat. Nos. 3,035,408; 3,091,077; 3,104,520; 3,195,805; 3,196,606; 3,270,495; 3,389,553; 4,005,578; 4,005,579 and 4,019,323; all of which relate to valve actuators with axially movable valve stems or rods. However, it is sometimes desirable to use other types of valve structures, such as relatively inexpensive butterfly valve or the like positionally adjusted by movement of a crank arm. With these valve structures, at least some arcuate motion of the actuator rod is required for adjusting the position of the valve. However, with prior art devices wherein the actuator rod is constrained for axial movement, relatively complex and multiple link mechanical couplings have been required between the rod and the valve structure for providing the desired arcuate movement. See, for example, U.S. Pat. Nos. 2,356,124; 2,374,708 and 3,069,614.

The present invention overcomes the problems and disadvantages of the prior art by providing an improved actuator for controlling the operation of a turbocharger having an outwardly projecting actuator rod, and means for sealing the housing to allow for axial and angular movement of the actuator rod with respect to the housing.

SUMMARY OF THE INVENTION

In accordance with the invention, a turbocharger control actuator comprises an actuator housing with an internal diaphragm dividing the housing into a pair of separate chambers. The diaphragm is connected to an actuator rod projecting through one of the chambers and outwardly from the housing for connection to a turbocharger control valve, such as a turbine wastegate valve. The diaphragm and the rod displace in response to a predetermined pressure differential applied to the diaphragm via ports opening into the chambers for connecting said chambers to a selected pair of pressure sources. Where one of the pressure sources comprises a vacuum such as the inlet pressure of a turbocharger compressor, the vacuum port is sized larger than the other port whereby excessive pressure build-up in the actuator housing is avoided in the event of diaphragm breakage.

In one embodiment of the invention, a sealing washer has an inner diameter for closing slidable reception over the actuator rod outside the actuator housing. The washer is movably retained in abutting relation with the exterior surface of the housing by an actuator mounting bracket secured to the housing, and allowing sliding movement of the washer adjacent the housing outer face. Accordingly, the rod is axially movable with respect to the washer, and the washer slidably shifts with respect to the housing to allow angular rod movement.

In another embodiment of the invention, a generally elongated, annular elastomeric seal is received over the actuator rod and has one end secured to the rod within the housing as by a snap ring. The elastomeric seal extends along the rod, and terminates in a radially outwardly extending enlarged bead sealingly trapped between the exterior surface of the housing and an actuator mounting bracket. Accordingly, the elastomeric seal prevents gas leakage between the rod and the housing and resiliently allows axial and angular rod movement with respect to the housing.

BRIEF DESCRIPTION OF THE DRAWINGS

The accompanying drawings illustrate the invention. In such drawings.

DETAILED DESCRIPTION OF THE PREFERRED EMBODIMENT

Figure 1:
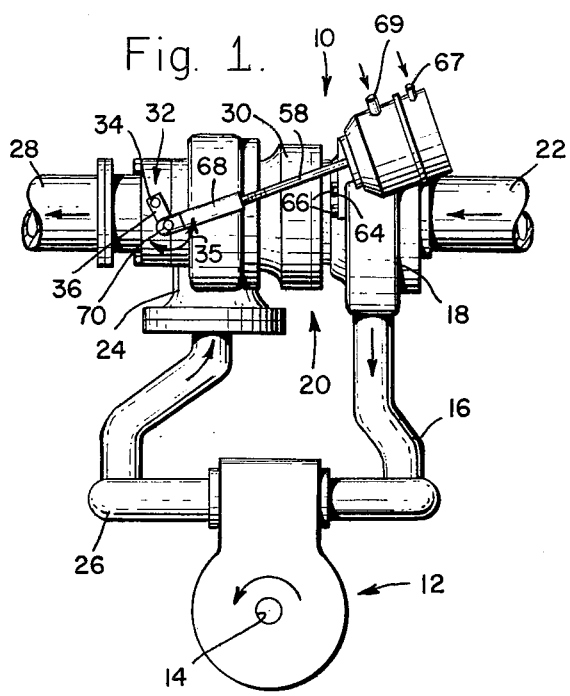
FIG. 1 is a schematic illustration of a control actuator of this invention mounted on a turbocharged combustion engine.

An actuator 10 of this invention is shown in FIG. 1 mounted on a turbocharged combustion engine 12. The engine 12 is generally conventional in form, and may comprise any of a wide variety of internal combustion engines such as a reciprocating engine of the type used for automotive vehicles having a driven crank shaft 14 for power output. Intake charge air for the engine is supplied through an intake manifold 16 from a compressor 18 of a turbocharger 20. The compressor 18 draws ambient air through an inlet 22, and compresses the air for supply to the engine. Exhaust gases expelled by the engine are coupled to a turbine 24 of the turbocharger via an exhaust manifold 26 before discharge through exhaust conduits 28. In operation, the exhaust gases rotatably drive the turbine 24 which, in turn, drives the compressor 18 via a shaft (not shown) in a central housing 30.

In many turbocharged engines, it is possible for the turbocharger 20 to operate at rotational speeds higher than the turbocharger mechanical components can withstand, or to supply compressed charge air to the engine at boost pressures higher than the engine can withstand. Specifically, at relatively high operating speeds or loads, the mass flow rate of exhaust gases is sufficient to drive the turbine 24 at a rotational speed exceeding turbocharger or engine critical design limits. To prevent damage to the system, limiting means are provided for preventing the rotational speed of the turbine and the compressor from exceeding a predetermined level, and thereby limit the compressor boost pressure. As shown in FIG. 1, one such limiting means comprises a wastegate valve assembly 32 mounted on the turbine 24, and including a pivot pin 34 extending outwardly from the turbine 24 and connected to a crank arm 36. Movement of the crank arm 36 through an arcuate path illustrated by the arrow 35 with respect to the axis of the pivot pin 34 serves to move an internally mounted valve (not shown), such as a butterfly or flap valve, to open and close a turbine bypass passage (also not shown). More specifically, the valve is disposed along an internal passage communicating between the exhaust manifold 26 and the exhaust conduits 28 so that a portion of the exhaust gases bypass the turbine when the valve is open consequently to limit turbocharger rotational speed and boost. Importantly, the specific construction of the turbine 24 including the valve assembly 32 and the bypass passage are generally well known in the art, and thereby are not shown or described in substantial detail. However, for a specific example of a representative turbocharger including the turbine, valve assembly, and bypass passage, see Applicant's pending U.S. patent application Ser. No. 804,687 now U.S. Pat. No. 4,120,156.

Figure 2:
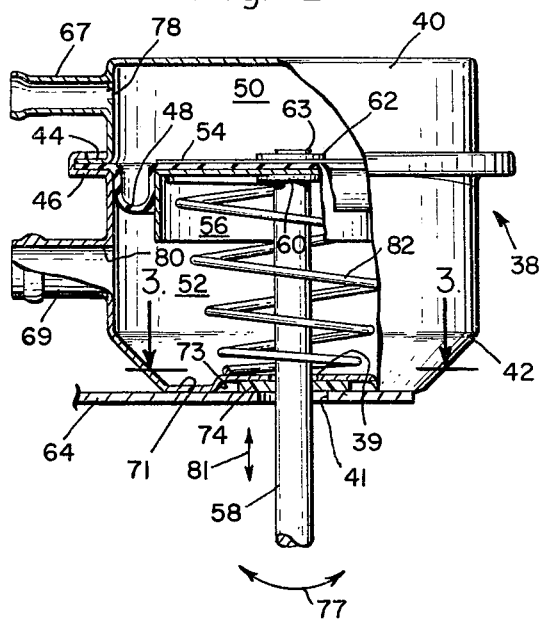
FIG. 2 is an enlarged fragmented elevation view of the actuator.
Figure 3:
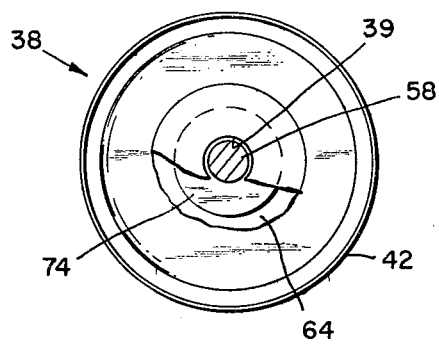
FIG. 3 is a fragmented horizontal section taken on the line 3—3 of FIG. 2.

The control actuator 10 of this invention is shown in FIGS. 2 and 3. As shown, the actuator 10 comprises a generally cylindrical metal housing 38 formed from complementary upper and lower halves 40 and 42, respectively. The housing halves 40 and 42 are each generally circular in cross section, and include radially outwardly extending flanges 44 and 46, respectively. A circular diaphragm 48 formed from a suitable flexible elastomeric material such as a fabric-based fluorosilicone extends across the housing 38 to divide the housing into two chambers 50 and 52. The periphery of the diaphragm 48 is received between the flanges 44 and 46, and is secured in place by means of the lower flange 46 rolled over the outer edge of the upper flange 44.

The central portion of the diaphragm 48 is stiffened by a pair of opposed retainer plates 54 and 56. An actuator rod 58 extends through the diametric centers of the plates 54 and 56 and the diaphargm 48, and is secured thereto as by a pair of washers 60 and 62 secured to the rod 58. In practice, the washer 60 may be formed integrally with the rod 58, and the washer 62 may be interposed between the upper retainer plate 54 and a staked end 63 at the upper end of the rod.

From the diaphragm 48, the rod 48 extends downwardly through the chamber 52, and outwardly from the housing 38 through an opening 39. As shown in FIGS. 1 and 2, the lower end of the rod 58 extends further through an opening 41 in a bracket 64 provided for connection of the actuator 10 to the turbocharger 20 by bolts 66, and is threadably received in a rod extension 68. The rod extension 68 in turn is pivotally connected to the end of valve assembly crank arm 36 by a pin 70. Accordingly, movement of the diaphragm 48 within the housing 38 displaces the rod 58 to swing the crank arm 36 about the axis of the pin 34, and thereby open or close the valve within the turbine 24. Importantly, the crank arm 36 swings through an arcuate path whereby the actuator rod 58 must be free to move axially and slightly angularly with respect to the housing 38.

As shown in FIGS. 2 and 3, sealing means are provided for sealing the passage of the rod 58 through the housing 38, as well as allowing axial an angular movement of the rod with respect to the housing. As shown, the lower exterior face 71 of the housing 38 is recessed upwardly adjacent the opening 39 to form a generally circular shaped seat 73 for receiving a sealing washer 74. The washer 74 preferably is formed from a suitable low friction synthetic resin such as a fluorocarbon resin sold under the trademark Teflon, and has an inner diameter for close but axially sliding reception and sealing engagement over the actuator rod 58. Specifically, in one embodiment of the invention, the washer 74 was formed from about 75% Teflon, about 20% glass fibers, and about 5% molybdenite. Importantly, the recessed seat 73 is sized to allow sliding movement of the washer 74 with respect to the housing lower face 71 whereby the rod 58 is allowed to move angularly through an arc of say about 10–20 degrees, illustrated by the arrow 77 in FIG. 2, as well as axially with respect to the housing, as illustrated by the arrow 81. The washer 74 is seated between the housing seat 73 and the bracket 63 which is fixed to the housing lower face 71 as by spot welding.

In operation, the diaphragm 48 is subjected to a predetermined pressure differential by means of hose fittings 67 and 69 suitably mounted on the housing 38 in alignment with a pair of ports 78 and 80 opening into the chambers 50 and 52, respectively. In this manner, pressure from one source is applied to the chamber 50, and pressure from a second source is applied to the chamber 52, whereby the diaphragm 48 movably responds to the pressure differential. A spring 82 is interposed between the lower retainer plate 56 and the lower face 71 of the lower housing half 42 to bias the diaphragm 48 upwardly, and thereby provide a threshold pressure differential at which diaphragm movement occurs.

In a typical application of the actuator 10, discharge pressure from the compressor 18 is applied to the upper chamber 50 via the port 78, and compressor inlet pressure is applied to the lower chamber 52 via the lower port 80. In this manner, during engine operation, substantial positive pressure is applied to the chamber 50, whereas a sub-atmospheric or negative pressure is applied to the chamber 52 to draw the washer 74 tightly against the seat 73 to seal against gas leakage. When the differential between the pressures reaches a level governed by the characteristics of the spring 82, the diaphragm 48 movably responds to shift the actuator rod 58 in an axial direction to alter the position of the wastegate valve in the turbine. Importantly, as shown, the size of the port 78 is substantially smaller than the size of the port 80 whereby pressure build-up in the actuator is prevented in the event of diaphragm breakage or failure. That is, in the event of diaphragm breakage, the port 80 is sized sufficiently to evacuate the housing interior, including any gas under pressure supplied via the port 80 whereby excessive pressure build-up is prevented. This is particularly important when the actuator is used in a conventional gasoline engine automotive set-up wherein pressurized gases supplied to the actuator comprise volatile air-fuel mixtures which could otherwise force past the sealing washer 74 toward hot engine components for ignition.

Figure 5:
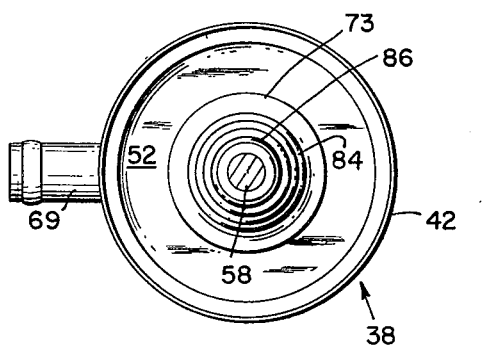
FIG. 5 is a fragmented horizontal section taken on the line 5—5 of FIG. 4.
Figure 4:
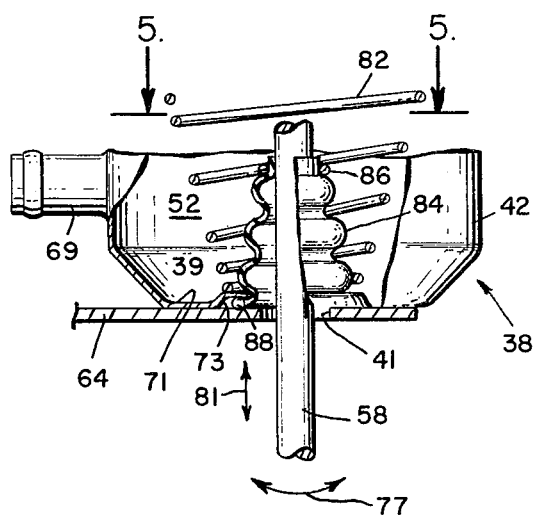
FIG. 4 is a fragmented elevation view similar to FIG. 2 showing an alternate embodiment of the invention.

An alternate embodiment of the invention is shown in FIGS. 4 and 5. As shown, an elongated, annular resilient seal 84 is received over the rod 58 within the lower chamber 52. The seal 84 preferably is formed from an elastomeric material with a generally bellows shape, or with any of a wide variety of shapes which may include one or more convolutions along the length of the seal. The seal has its upper and closely received about the rod 58 and sealingly fixed in position thereon as by a snap ring 86. As shown, the seal extends downwardly from the snap ring 86 in an accordion-like fashion, and terminates in a radially outwardly projecting enlarged bead 88 interposed between the lower face 71 of the housing and the mounting bracket 64. The bracket 64 serves to maintain the bead 88 of the seal 84 in position in the same manner as the sliding washer 74 of the previous embodiment. Accordingly, the seal 84 serves to allow sliding axial movement of the rod 58 with respect to the housing 38 as well as a degree of angular movement for arcuately shifting the position of the crank arm 36 on the turbocharger 20 (FIG. 1).

The control actuator of this invention may include a wide variety of modifications and improvements within the scope of this invention. For example, the valve assembly 32 may comprise any of a wide variety of valve assemblies such as wastegate valves, pop-off valves, compressor inlet valves, etc. Moreover, the actuator housing may be adapted to respond to any chosen pressure or pressure differential wherein an axially and angularly movable actuator rod projects outwardly from a sealed housing chamber. These and other variations are believed to be within the skill of the art when taken in conjunction with the invention as defined in the appended claims.

What is claimed is:

1. An actuator for controlling a turbocharger comprising a housing; a pressure responsive diaphragm dividing said housing into a pair of chambers; an actuator rod having one end connected to said diaphragm for movement therewith and extending therefrom through one of said chambers and out of said housing through an opening formed in said housing; a first port coupled to subatmospheric pressure opening into said one chamber; a second port coupled to positive pressure opening into the other of said chambers; a relatively rigid washer carried slidably on said rod and slidably with respect to said housing for sealing the passage of said rod through said opening to allow axial and angular movement of said rod, said housing including an exterior recess adjacent the opening forming a seat for receiving said washer; and retaining means for retaining said washer in slidably sealing relation with said housing, whereby sub-atmospheric pressure in said one chamber serves to help draw said washer into sealing relation with said housing.

2. An actuator as set forth in claim 1 wherein said first port is sized larger than said second port.

3. An actuator as set forth in claim 1 wherein said retaining means comprises a bracket connected to said housing, said bracket and housing together forming said seat for movably retaining said washer.

4. An actuator as set forth in claim 1 wherein said washer is formed primarily from a fluorocarbon resin.

5. An actuator as set forth in claim 1 wherein said washer comprises a solid generally disk-shaped annular ring.

6. An actuator as set forth in claim 1 wherein said washer comprises a unitary generally disk-shaped annular ring.

7. An actuator as set forth in claim 1 wherein said washer comprises a generally disk-shaped annular ring having a relatively smooth-surfaced axial face presented toward said housing adjacent said opening, and wherein the subatmospheric pressure in said one chamber draws said axial washer face into sealing relation with said housing.

8. An actuator for controlling a turbocharger comprising a housing; a diaphragm dividing said housing into a pair of chambers; means for supplying pressure from different sources to said chambers to apply a pressure differential to said diaphragm, said means including a first port coupled to subatmospheric pressure opening into one of said chambers and a second relatively smaller port coupled to positive pressure opening into the other of said chambers; an actuator rod having one end connected to said diaphragm and extending therefrom through said one of said chambers and out of said housing through an opening formed in said housing; a generally annular, axially elongated resilient seal carried on said rod for sealing the passage of said rod through said opening and permitting axial and angular movement of said rod with respect to said housing; means for securing one end of said seal to said rod within said housing, said other end of said seal including an enlarged radially outwardly extending bead, said housing including an exterior recess adjacent said opening forming a seat for receiving said bead; and a bracket mounted on said housing for bindingly retaining said bead with said recess in sealing relation with said housing.

9. A valve actuator for controlling the position of a turbocharger control valve comprising a housing; a pressure responsive diaphragm dividing said housing into a pair of chambers, said housing including a first port opening into one of said chambers and a second relatively larger port opening into the other of said chambers; means for coupling said first port to a source of positive pressure and for coupling said second port to a source of subatmospheric pressure whereby said diaphragm is subjected to a pressure differential; an actuator rod having one end connected to said diaphragm for movement therewith and extending through the other of said chambers and out of the housing through an opening formed in said housing; sealing means received over said rod; and a bracket mounted on said housing and retaining said sealing means between said rod and said housing adjacent the opening formed in said housing, said bracket being for mounting the actuator with respect to the valve, said sealing means being slidably carried with respect to the housing for allowing axial and angular movement of said rod with respect to said housing. and being drawn into sealing relation with said housing by the subatmospheric pressure in said other chamber.

10. In an actuator having a housing, pressure responsive means within said housing and dividing the same into a pair of chambers, and an actuator rod connected to said pressure responsive means and extending therefrom through one of said chambers out of said housing through an opening formed in said housing, a method of sealing the passage of said rod through said opening to allow axial and angular movement of said rod comprising the steps of coupling said one chamber to a subatmospheric pressure via a first port; coupling the other chamber to a positive pressure via a second relatively smaller port; receiving an axially elongated, generally annular resilient seal over said rod; securing one end of said seal to said rod; and securing the other end of said seal with respect to said housing with a bracket mounted on said housing whereby said seal accommodates axial and angular movement of said rod, and other end of said seal including a radially outwardly extending bead received in a recessed seat formed on said housing adjacent the opening whereby the bead is bindingly retained within said seat.

11. A valve actuator for controlling the position of a valve comprising a housing; a diaphragm dividing said housing into a pair of chambers, said housing including a first port opening into one of said chambers and a second relatively larger port opening into the other of said chambers; means for coupling said first port to a source of positive pressure and for coupling said second port to a source of subatmospheric pressure whereby said diaphragm is subjected to a pressure differential; an actuator rod having one end connected to said diaphragm and extending through the other of said chambers and out of said housing through an opening formed in said housing; a relatively rigid washer slidably received over said rod and slidably received in a recess forming a seat on said housing adjacent the opening formed in said housing; and a bracket mounted on said housing and retaining said washer within said seat, said bracket being for mounting the actuator with respect to the valve, and said washer allowing axial and angular movement of said rod with respect to said housing.

12. A valve actuator for controlling the position of a valve comprising a housing; a diaphragm dividing said housing into a pair of chambers, said housing including a first port opening into one of said chambers and a second relatively larger port opening into the other of said chambers; means for coupling said first port to a source of positive pressure and for coupling said second port to a source of subatmospheric pressure whereby said diaphragm is subjected to a pressure differential; an actuator rod having one end connected to said diaphragm and extending through the other of said chambers and out of the housing through an opening formed in said housing; and axially elongated, generally annular resilient seal received over said rod, and including a radially outwardly extending bead received in a recess forming a seat on said housing adjacent said opening; and a bracket mounted on said housing and retaining said resilient seal with respect to said seat, said bracket being for mounting the actuator with respect to the valve, and said resilient seal allowing axial and angular movement of said rod with respect to said housing.

* * * * *